April 14, 1959 R. M. WARREN 2,882,473
SERVOMOTOR SYSTEM FOR OPERATING STEERING ENGINES OF SHIPS
Filed Nov. 7, 1956
2 Sheets-Sheet 1
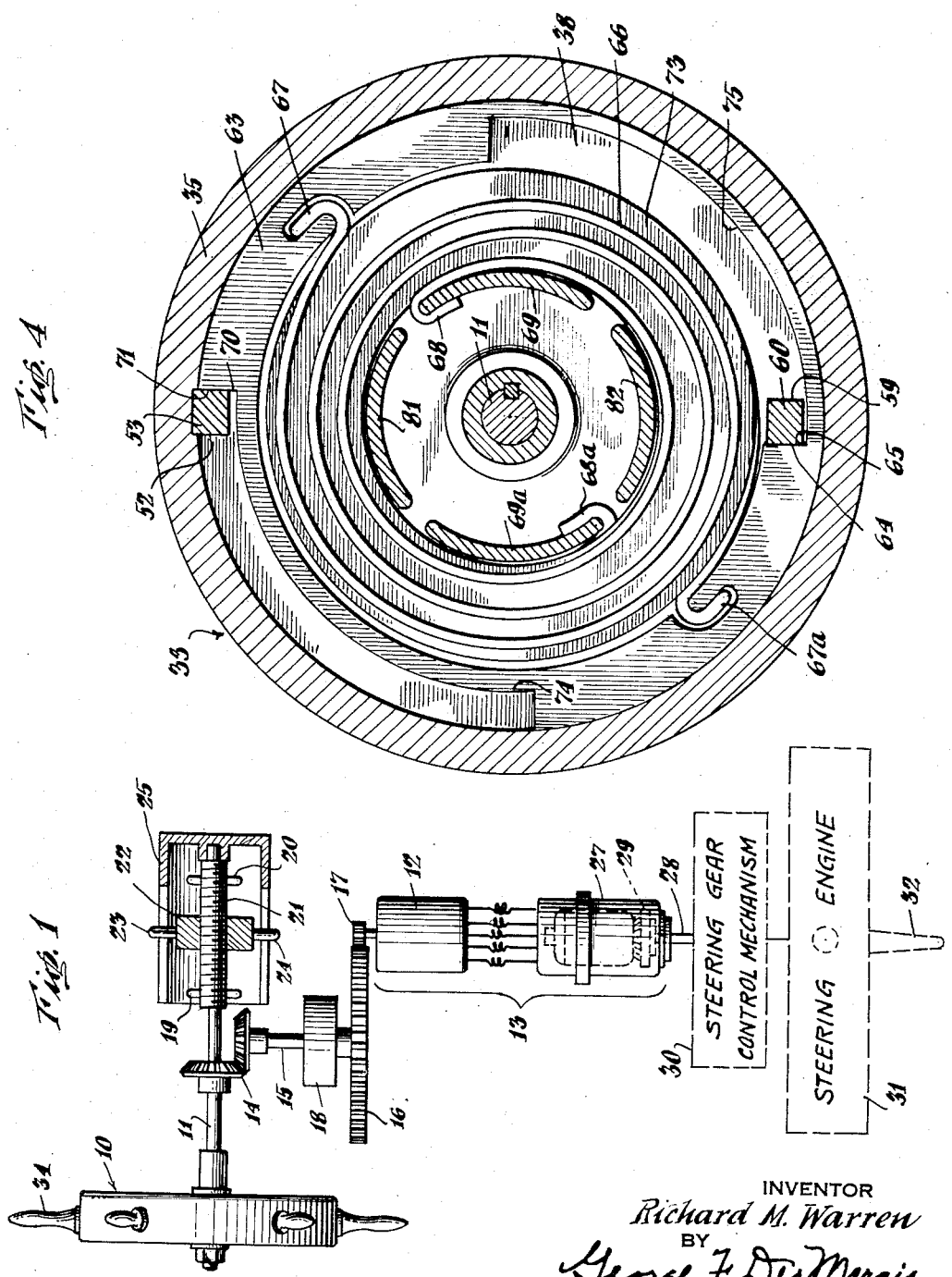
INVENTOR
Richard M. Warren
BY
George F. DesMarais
ATTORNEY April 14, 1959
R. M. WARREN
2,882,473
SERVOMOTOR SYSTEM FOR OPERATING STEERING ENGINES OF SHIPS
Filed Nov. 7, 1956
2 Sheets-Sheet 2
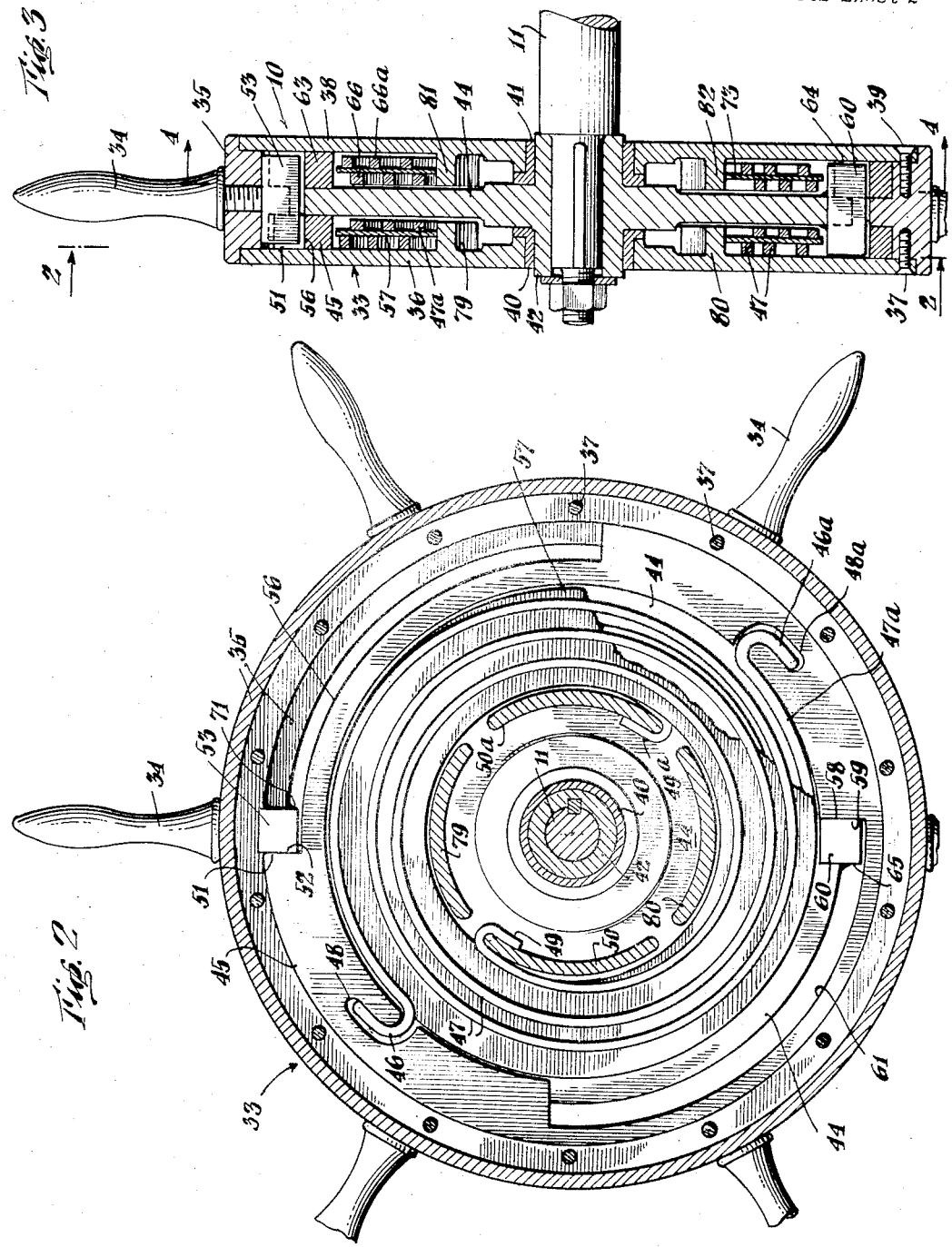
INVENTOR
Richard M. Warren
BY
George F. Des Marais
ATTORNEY

United States Patent Office 2,882,473
Patented Apr. 14, 1959

2,882,473

SERVOMOTOR SYSTEM FOR OPERATING STEERING ENGINES OF SHIPS

Richard M. Warren, Surf City, N.J., assignor to C. H. Wheeler Manufacturing Company, Philadelphia, Pa., a corporation of Pennsylvania Application November 7, 1956, Serial No. 620,829

9 Claims. (Cl. 318—24)

This invention relates to apparatus for operating steering engines of ships and other dirigible bodies, and more particularly to a steering wheel assembly and synchronous transmission system to control the operation of a steering gear control mechanism by which a steering engine and a rudder are operated.

In a steering system of the type to which the invention appertains it is understood that a steering wheel rotates a synchro transmitter which turns a synchro receiver in unison therewith to actuate one side of differential gearing which constitutes a part of the steering gear control mechanism by which one or more variable delivery pumps are regulated to control the operation of a steering engine. Any movement of the steering wheel produces a corresponding movement of the steering engine and rudder. The steering gear control mechanism includes a follow-up device which communicates the movement of the steering engine and rudder to the other side of the differential gearing to adjust the rate of delivery of the variable delivery pumps so that the rudder is held steady or turns in accordance with the position or movement of the steering wheel.

Low power generators and motors of the same size may be employed for transmitting motion from a steering wheel to the differential of the steering gear control mechanism. In such a synchronous transmission system, the motor turns exactly the same amount as the generator under all normal conditions of rotation of the generator, and it is the purpose of the present invention to prevent any mishandling of the steering wheel from affecting the proper operation of a remote control synchronous transmission system.

It is recognized that a helmsman can mishandle a steering wheel in such a manner as to cause a generator and a motor to pull out of step and even to cause the motor to spin under some conditions with disastrous results on the control desired for the steering of a ship. The throwing of the transmission system out of synchronism can be effected by a too rapid acceleration of the steering wheel, or by jerking the wheel, as in making a quick reversal, or as the result of forcibly striking one or the other of stops which limit the rotation of the wheel in opposite directions. Attempts have been made to discourage heavy-handed helmsmen from mishandling the steering wheel by excessively loading the wheel with a heavy braking force, but this procedure cannot be depended on to prevent jerking, and has the further objection of constantly burdening the helmsmen with unnecessary effort.

The present invention provides for preventing the operation of a synchronous transmission system in any manner that could throw the transmitter and the receiver out of synchronism. The generator of the transmission system is operated by a steering wheel which is so constructed as to smoothen out the effect on the generator of a sudden or too rapid application of torque to the wheel. The torque on the rim of the wheel is transmitted to a member keyed to the shaft of the wheel through rings and springs which are preloaded to a degree to prevent relative rotation between the rim and the shaft under all normal operating conditions. The rings and the springs are reversely mounted and arranged so that when the rim is jerked in either direction, the springs allow the shaft of the wheel to rotate at less angular velocity through the same angular distance as the rim of the wheel has turned.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part of the disclosure, in which:

Fig. 1 is a diagrammatic representation of an embodiment of the steering apparatus of the present invention;

Fig. 2 is an elevational view of a steering wheel assembly taken on line 2—2 of Fig. 3;

Fig. 3 is a sectional view through the axis of the steering wheel assembly; and

Fig. 4 is a section of the steering wheel assembly on line 4—4 of Fig. 3.

In Fig. 1 there is shown a steering wheel assembly 10 mounted on a shaft 11 by which a synchro transmitter or generator 12 of a synchronous transmission system 13 is driven proportionally to the rotation of the steering wheel assembly. The drive from the shaft 11 to the generator 12 is through a pair of bevel gears 14, shaft 15, gear 16 and a pinion 17. A small brake 18 is applied to the shaft 15 to establish a drag on the steering wheel so the wheel effort can be adjusted to suit a helmsman.

As is customary in steering devices, limit stops are provided for limiting the rotation of the wheel in opposite directions. As is shown in Fig. 1, the limit stops 19 and 20 are fixed in position on a screw 21 which is part of the shaft 11. The rotation of the shaft is stopped when a travelling nut 22 engages one or the other of the limit stops. The nut 22 is held against rotation by the engagement of pins 23 and 24 in longitudinal slots in a stationary member 25.

The synchro transmission system includes a synchro transmitter or generator 12 and a synchro receiver or motor 27 which rotates in synchronism with the generator. The rotor shaft 28 carries a vaned wheel 29 which rotates in a liquid bath and serves as a damper to inhibit dynamic instability which may occur when the system is originally energized and the generator and motor units swing into step. This may cause as much as 180° swing of the motor as the generator is held. The damper prevents the motor from oscillating or from starting to run as a motor.

The rotor shaft 28 of the motor turns one side of a differential of a steering gear control mechanism which is diagrammatically shown at 30. This mechanism operates a steering engine 31 which turns a rudder 32. Various types of steering gear control mechanisms and steering engines are known. Since reference may be made to U.S. Patent No. 1,993,475 for an understanding of their construction and operation it is unnecessary to describe them herein. In brief, the rotor shaft 28 operates one side of the differential of the steering gear control mechanism and a follow-up device, which is operated by the steering engine and in accordance with the angle of the rudder, turns the other side of the differential in the opposite direction. The center or spider of the differential carries a slotted cam which controls the rate of delivery of a variable delivery pump or pumps by which the rams of the steering engine are operated.

The steering wheel assembly 10 enables smooth rotation of the shaft 11 and of the generator 12 under any operational conditions which may occur on shipboard. The steering wheel assembly includes a manipulatable member 33 having a plurality of handles 34 extending from an annular rim 35, a circular front plate 36 secured to the front of the rim by a plurality of screws 37, and a circular rear plate 38 secured to the back of the rim by a plurality of screws 39, Fig. 3. The plates have central openings encircling bearings 40 and 41 which are mounted on the outside of the hub 42 of a member 44 which is keyed to the shaft 11.

The member 44 is in the form of a disk but it acts essentially as a lever arm by which the shaft 11 is rotated. The member 44 turns simultaneously with and at the same rate as the manipulatable member 33 during all normal rotational movements of the member 33, but is rotatable with respect to the member 33 under special conditions, as will presently appear. The members 33 and 44 are resiliently interconnected by reversely arranged springs and rings which are located at either side of the member 44. Oppositely acting springs and rings are shown in Figs. 2 and 4, respectively, as viewed from the front of the wheel assembly.

Referring to Fig. 2, a ring 45 is located in front of the member 44. One end 46 of a spiral spring 47 is locked into a notch 48 in the ring 45 and the other end 49 of the spring engages a projection 50 which extends laterally from the front face plate 36. The ring 45 has a shoulder or an abutment 51 which is normally held by the tension in the spring against one side 52 of a key or lug 53 permanently secured in a notch at the interior of the rim 35. The shoulder 51 is at one end of a notch or recess 56 in the outer perimeter of the ring. The recess extends clockwise from the shoulder as viewed in the drawing in order to provide clearance for movement of the key 53 clockwise from the shoulder 51. Although one spring 47 will provide the action desired at the front side of the member 44, a second spiral spring 47a is used in order to balance the pull of a single spring diametrically across the axis of the shaft 11. The two springs 47 and 47a act together in the same direction. The spring 47a has one end 46a hooked into a notch 48a in the ring 45 and its other end 49a hooked onto a projection 50a of the front face plate 36. The two springs are separated by a circular plate 57.

The front ring 45 has a shoulder 58 which normally contacts one side 59 (Fig. 2) of a key or lug 60 permanently secured in a notch in the periphery of the member 44, and the ring is recessed at 61, clockwise from the shoulder 58 as viewed in the drawing, in order to provide clearance whenever the shoulder 58 moves away and becomes disengaged from the lug 60 under conditions which will be explained hereinafter.

The lug 60 is normally held in contact with the shoulder 58 of the front ring 45 by another ring 63 and a pair of springs 66 and 66a (Figs. 3 and 4), which are similar to the ring 45 and the springs 47 and 47a, respectively, but are reversed with respect thereto and are located between the member 44 and the rear face plate 38. A shoulder 64 (Fig. 4) of the ring 63 engages the side 65 of the lug 60.

The spring 66 has one end 67 hooked into a notch in the ring 63 and its other end 68 hooked onto a projection 69 extending laterally from the rear face plate 38. A shoulder 70 on the ring 63 is normally held in contact with the side surface 71 of the key 53. The ends 67a and 68a of the spring 66a are anchored, respectively, to the ring 63 and a projection 69a on the rear face plate 38. A circular plate 73 serves as a spacer to separate the springs 66 and 66a.

The springs 66 and 66a are coiled oppositely to the springs 47 and 47a and the combined action of all of the springs causes the rings 45 and 63 to press the lug 60 between their respective shoulders 58 and 64 and to hold the member 44 at a given angular position with respect to the key 53 and the member 33. The ring 63 has a recess with a limited arc 74 of reduced radius extending counterclockwise from the shoulder 70 in order to provide clearance for counterclockwise movement of the key 53, and the ring 63 is recessed at 75 counterclockwise from the shoulder 64 in order to provide clearance whenever the shoulder 64 becomes disengaged from the lug 60.

The springs are prestressed at a tension sufficiently to cause the member 44 and the shaft 11 to turn simultaneously with and at the same rate as the manipulatable member 33 under all normal operating conditions of the wheel assembly. It is manifest that an applied torque on the member 33 sufficient to overcome the preloading of the springs would cause one pair of springs to deflect and the other pair of springs to turn with its associated ring and the member 33. Assuming the member 44 and the key 60 are held stationary, counterclockwise movement of the member 33 and the key 53 would cause deflection of the springs 66 and 66a and clockwise movement of the member 33 would cause deflection of the springs 47 and 47a.

The initial tension of the springs 47 and 47a can be changed by engaging the ends 49 and 49a onto the projections 79 and 80, respectively, and the same tension can be applied to the springs 66 and 66a by hooking the ends 68 and 68a onto the projections 81 and 82, respectively. Further adjustment of the tension of the springs may be obtained by changing the setting of the fixed relationship between the rim 35 and the front and rear plates 36 and 38 through angles corresponding with the spacing of the screws 37 and 39 circumferentially around the rim, or corresponding with multiples of their spacing.

During all normal steering movements the rings are oppositely pressed into resilient engagement with the key 53 and the lug 60 and the entire wheel assembly turns as a unitary body.

An inordinately rapid acceleration of the rim of the wheel in either direction of rotation is rendered ineffective to produce the same acceleration on the shaft of the wheel and the generator 12. A too rapid acceleration may be caused by a jerk or a quick reversal. Should the member 33 be jerked counterclockwise, as viewed in the drawing, the front ring 45 (Fig. 2) will be advanced in the same manner by the key 53, but owing to the inertia of the member 44 and the parts driven thereby, the front ring 45 will be carried away from the key or lug 60. During the same counterclockwise movement, the rear ring 63 (Fig. 4) will tend to follow the key 53 under the action of the rear springs 66 and 66a and thereby resiliently advance the lug 60 and the member 44 in the same direction but at a lesser speed until the lug 60 has been angularly displaced the same distance as the key 53. The length of the recess 61 in the front ring 45 is great enough to allow for the displacement of the lug 60 from the shoulder 58 of the front ring 45.

A similar action in reverse takes place when the member 33 is jerked clockwise. In that case the rear ring 63 (Fig. 4) is advanced by the key 53 and is drawn away from the lug 60. As this occurs, the front springs 47 and 47a tighten and tend to maintain the front ring 45 in engagement with the lug 60 and thereby rotate the lug 60 and the member 44 through the same arc of movement as the key 53 but at a lesser speed until the lug has moved a distance equal to the distance of movement of the key 53 from its position at which the jerk was initiated. The length of the recess 75 in the rear ring 63 permits relative displacement between the rear ring 63 and the lug 60.

The recess 56 in the front ring 45 permits relative movement between the front ring 45 and the key 53 whenever the movement of the lug 60 is slowed or stopped during a counterclockwise movement of the member 33, and the recess 74 in the rear ring 63 permits relative movement between the rear ring 63 and the key 53 whenever movement of the lug 60 is slowed or stopped during a clockwise movement of the member 33. The stopping of the member 44 abruptly may be caused by the engagement of the travelling nut 22 with one or the other of the limit stops 19 and 20 depending on the direction of rotation of the wheel.

The application and use of the invention will be apparent to those skilled in the art in view of the foregoing disclosure. While an apparatus has been described which is presently considered to represent the best mode of carrying out the invention, it is to be understood that various features and elements in the combinations and relationships involved may be altered and others omitted without departing from the scope of the invention privileged by the appended claims.

What is claimed is:

1. In apparatus for remotely controlling the operation of a steering gear control mechanism, the combination comprising a steering wheel including a manipulatable member and a follower member rotatably driven by said manipulatable member, resiliently yieldable means interconnecting said members, a synchronous transmission including a generator driven by said follower member of said steering wheel and a motor driven by said generator, said motor having a shaft for controlling said steering gear control mechanism and a damper on said last-named shaft.

2. In an apparatus for manually controlling a device from a remote point, the combination comprising a generator and a motor each having field windings and rotor windings electrically connected together for synchronous operation, a shaft driven by said motor, means for dampening the rotation of said shaft, a device driven from said shaft, and manually operable means for driving said generator, said last-named means including a manually rotatable member, a follower member driven from said rotatable member, gearing connecting between said follower member and said generator whereby the generator is driven at a speed directly proportional to the speed of said follower member, means interconnecting said members whereby said follower member is normally turned through the same angle through which said rotatable member is turned, said interconnecting means including tensioned springs acting oppositely and exerting force on said rotatable member and said follower member for normally restraining relative rotary movement between said members, said interconnecting means being so constructed and arranged as to effect differential rotation between said rotatable member and said follower member on the flexing of said springs due to an inordinately rapid movement of said rotatable member thereby allowing said follower member to follow said rotatable member and turn through an angle equal to the angular displacement of the rotatable member but at a lesser angular velocity.

3. In a steering wheel assembly, the combination comprising a manipulative member and a follower member rotatably mounted on a common axis, a driven shaft rigidly connected to said follower member, a pair of rings, means for engaging a first ring of said pair of rings with both of said members in one direction of rotation of said first ring, a spring tensioned between said manipulative member and said first ring and normally pressing said first ring into engagement with said manipulative member, means for engaging a second ring of said pair of rings with both of said members in the opposite direction of rotation of said second ring, a spring tensioned between said manipulative member and said second ring and normally pressing said second ring into engagement with said manipulative member, said second spring acting reversely to said first spring thereby to enable said manipulative member, rings, springs and follower member to be rotated together as a unit under normal operation of said manipulative member and as long as the load on said shaft is not so excessive as to cause flexing of said springs and accompanying tempo-rary disengagement of either said first ring or second ring from engagement with said manipulative member depending on the direction of rotation of the steering wheel assembly.

4. A steering wheel assembly comprising a pair of relatively rotatable members, a pair of rings, means for engaging a first ring of said pair of rings with both of said members in one direction of rotation of said first ring, a spiral spring tensioned between said first ring and one member of said pair of rotatable members, means for engaging a second ring of said pair of rings with both of said members in the opposite direction of rotation of said second ring, and a spiral spring tensioned between said second ring and said one member of said pair of rotatable members, said first and second springs tensioned and acting reversely to one another on the respective rings.

5. A steering wheel assembly comprising a member adapted to be fixed to a shaft for rotating the shaft, a manipulatable member rotatably mounted with respect to said first member, each of said members carrying a key fixed to itself, means yieldably connecting said members for simultaneous rotation in either direction of rotation, said means including a ring and a spiral spring coiled in one direction, a ring and a spiral spring coiled in the opposite direction, one end of each of said springs being anchored to said manipulatable member, said first spring having its other end attached to said first ring and yieldingly pressing said first ring in one direction of rotation against both of said keys, said second spring having its other end attached to said second ring and yieldingly pressing said second ring in the opposite direction of rotation against both of said keys.

6. A steering wheel assembly comprising a member adapted to be fixed to a shaft for rotating the shaft, a manipulatable member rotatably mounted with respect to said first member, each of said members carrying a key fixed to itself, means yieldably connecting said members for simultaneous rotation in either direction of rotation, said means including a ring and a spiral spring coiled in one direction, a ring and a spiral spring coiled in the opposite direction of rotation, one end of each of said springs being anchored to said manipulatable member, said first spring having its other end attached to said first ring and said second spring having its other end attached to said second ring, a shoulder on each of said rings normally engaging opposite sides of said key carried by said manipulatable member, each of said rings having an arcuate recess extending from said shoulder for providing clearance for permissible movement of said key carried by said manipulatable member relatively to said rings, a second shoulder on each of said rings normally engaging opposite sides of said key carried by said first member, each of said rings having an arcuate recess extending from said second shoulder for providing clearance for permissible movement of said key carried by said first member relatively to said rings, said shoulders being normally held in engagement with said keys by said springs.

7. A steering wheel assembly comprising a member adapted to be fixed to a shaft for rotating the shaft, a manipulatable member rotatably mounted with respect to said first member, each of said members carrying a key fixed to itself, means yieldably connecting said members for simultaneous rotation in either direction of rotation, said means including a ring and a spring acting in one direction of rotation and another ring and a spring acting in the opposite direction of rotation, one end of each of said springs being anchored to said manipulatable member, each of said springs having its other end attached to different ones of said rings, means on said rings for engaging opposite sides of said key carried by said manipulatable member, said rings having shoulders for engaging opposite sides of said key carried by said first member as urged by said springs and recesses extending from said shoulders for providing clearances for said key carried by said first member for permitting movement of one of said rings relative to said first member in one direction and movement of the other of said rings relative to said first member in the other direction.

8. A steering wheel assembly comprising a driven member adapted to be fixed to a shaft for rotating the shaft, a member for rotatably driving said driven member, said driven member being in the form of a disk centrally contained within said driving member, a key fixed to said driving member outside of the periphery of said driven member, a key fixed to said driven member, means yieldably connecting said driving and driven members for simultaneous rotation in either direction of rotation, said means including a ring on one side of said driven member and having a shoulder for engaging said first key and a shoulder for engaging said second key, a coiled spring having one end anchored to said driving member and its other end anchored to said ring and constantly urging said ring to turn clockwise to engage said shoulders and said keys, a second ring located to the other side of said driven member and disposed reversely with respect to said first ring and having shoulders for engaging said keys, a spiral spring coiled reversely with respect to said first coiled spring and having one end anchored to said driving member and its other end anchored to said second ring and tensioned for rotating said second ring counterclockwise so that the shoulders of said second ring are urged to contact with said keys, said rings having recesses extending from said shoulders on the respective rings for providing clearances for said keys whereby the tension in said springs enables said driving member and said driven member to be rotated as a unitary body or with the driven member elastically following the driving member.

9. A steering wheel comprising a member adapted to be fixed to a shaft for rotating the shaft, a manipulatable member including a rim, circular front and rear side plates fastened to said rim and rotatably mounted on said first member, and a key extending inwardly from said rim; a ring within said rim and having a recess providing clearance for said key and a shoulder at one end of the recess for normally engaging one side of said key, a tensioned spring having one end fastened to said front side plate and its other end fastened to said ring and normally urging said shoulder of said ring against said key; a second ring within said rim and having a recess providing clearance for said key and a shoulder at one end of the recess for normally engaging the side of said key facing oppositely to said first mentioned side of said key, a second tensioned spring acting reversely to said first-named spring and having one end fastened to said rear side plate and its other end fastened to said second ring and normally urging the said shoulder of said second ring against said key; a key carried by said first member, each of said rings having a recess providing clearance for said second-named key and a shoulder for normally engaging said second-named key so that when said manipulative member is turned in either a clockwise or counterclockwise direction said first-named member is turned through a correspondnig angle at the same or at a lower speed.

References Cited in the file of this patent

UNITED STATES PATENTS

| 402,311 | De Ferrati | Apr. 30, 1889 |
| 431,124 | Rae | July 1, 1890 |
| 1,909,815 | Florez | May 16, 1933 |
| 2,567,202 | Goertz | Sept. 11, 1951 |
| 2,768,339 | Gelb | Oct. 23, 1956 |

OTHER REFERENCES

Servo Mechanism Fundamentals, Lauer, Lesnick, Matson, first edition, page 64, Fig. 4.1, McGraw-Hill, 1947.